(No Model.)

C. M. BLYDENBURGH.
VEHICLE.

No. 415,606. Patented Nov. 19, 1889.

WITNESSES
J. H. Fowler
W. H. Patterson

INVENTOR
C. M. Blydenburgh
by A. H. Evans & Co
Attorneys

UNITED STATES PATENT OFFICE.

CHARLES M. BLYDENBURGH, OF RIVERHEAD, NEW YORK.

VEHICLE.

SPECIFICATION forming part of Letters Patent No. 415,606, dated November 19, 1889.

Application filed September 21, 1889. Serial No. 324,632. (No model.)

*To all whom it may concern:*

Be it known that I, CHARLES M. BLYDENBURGH, a citizen of the United States, residing at Riverhead, in the county of Suffolk and State of New York, have invented certain new and useful Improvements in Vehicles, of which the following is a full and clear description, reference being had to the accompanying drawings, forming part of this specification, in which—

Figure 1:
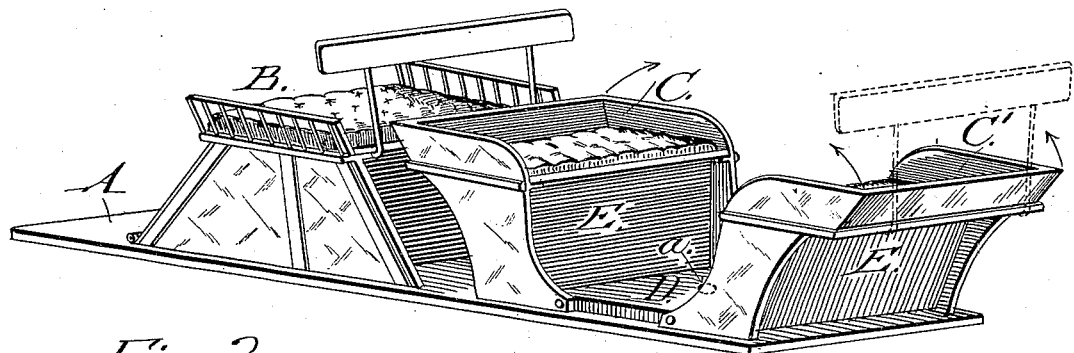
Figure 2:
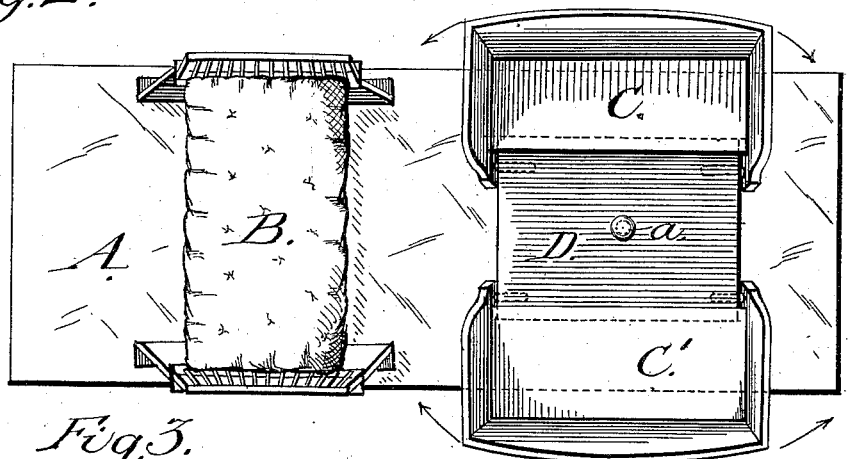
Figure 3:
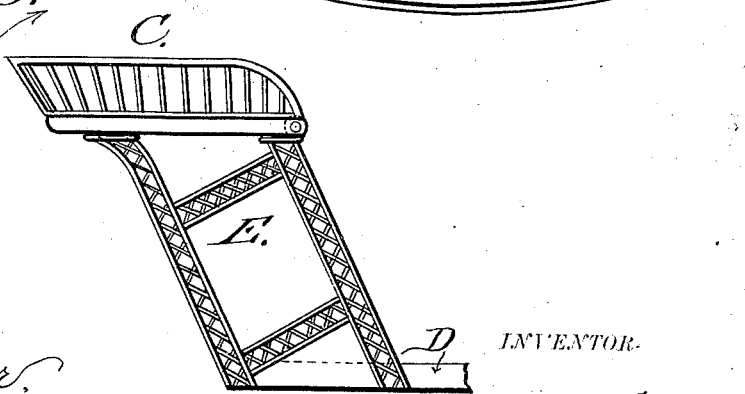

Figure 1 represents a perspective view of a vehicle-body, showing the arrangement as seats. Fig. 2 is a plan view showing the rear seats turned around. Fig. 3 is a modification showing the rear seat-standards constructed of a light metallic frame-work.

My invention relates to certain new and useful improvements in vehicles, and especially in that class employing front and rear seats; and my invention consists, essentially, in connecting the rear seat portions to a base pivoted to the bottom or floor of the vehicle, so that the rear seats may be turned from a position transverse of the body of the vehicle to a position longitudinal thereof or parallel with the sides of said body.

My invention also consists of the improved constructions and combinations of parts which I shall hereinafter fully describe and claim.

To enable others skilled in the art to make and use my invention, I will now describe its construction and indicate the manner in which I carry the same out.

In the said drawings, A indicates the floor or bottom of any well-known or desired form of vehicle, and B is the front seat, which may be stationary thereon, or may be hinged at its front lower portion to the floor or bottom, so that it may be turned forward when desired, for a purpose I will hereinafter disclose. This seat B may be constructed in any suitable manner. It may have its seat portion proper upholstered, and it may or may not be provided with a lazy-back.

In rear of the front seat B, I locate two inwardly-facing rear seats C C', these two seats being so connected with each other that their positions on the floor or bottom A may be changed from the position shown in Fig. 1 to that shown in Fig. 2, in which latter position they are parallel with the sides of the floor or bottom and brought nearer the front seat, whereby the occupants of these rear seats may freely converse with those occupying the front seat. In carrying out this part of my invention I prefer to connect the rear seats C C' with a base plate or board D, that is common to both, and pivotally secure this plate or board to the floor or bottom A of the vehicle by means of a bolt or pin $a$, which passes centrally through the base-plate and serves as the axis about which the rear seats may turn horizontally from one position to a position at right angles thereto.

The rear seats may be upholstered in any desired manner and may or may not have a lazy-back, and they are also mounted upon standards E, which may be of box form, as shown in Fig. 1, or, if preferred, may be composed of a light and ornamental metallic frame-work, such as is shown in Fig. 3. In either case these standards will be connected with or will be formed integral with the base plate or board, so as to turn therewith and carry the seats which they support from one position to another.

If the middle seat—or, in other words, the foremost rear seat—is placed close to the rear of the front seat, it may be found necessary to round the corners of the rear seats, and as the distance between the backs of the rear seats may be greater than the distance between the wheels of the vehicle, these seats in turning may strike the wheels, to the injury of the seat-standards or other parts. Therefore I prefer to hinge or pivot these rear seats so that they may be folded inward toward each other, and thereby permit the base-board and seats to be turned from a position parallel with the front seat, as in Fig. 1, to a position at right angles thereto, or parallel with the sides of the vehicle, as in Fig. 2. The pivoting of these seats may be at the inner lower corners of the standards, as in Fig. 1, in which case they are pivoted directly to the base board or plate; or the seat portions proper may be pivoted to the upper inner corners or front of the standards, as in Fig. 3. In either case the result is the same, as the seats may be folded inward to clear the wheels when shifting the seats from the position in Fig. 1 to that shown in Fig. 2.

I do not wish to be understood as limiting myself to any particular form of front seat or construction of rear seats or standards therefor, the principal feature of my invention being connecting the rear seats with an axially-moving base, so that these seats may be turned to instantly convert the vehicle from one possessing three seats placed parallel with each other to one where the rear seats are parallel with each other and with the sides of the vehicle, but at right angles with the front seat.

A vehicle constructed as above described is very desirable, as it permits the occupants to freely converse with each other without assuming uncomfortable positions, and for the further reason that the occupants of the rear seat may readily enter and leave the vehicle from the rear without danger of soiling their clothes by contact with the wheels.

Having thus described my invention, what I claim as new, and desire to secure by Letters Patent, is—

1. A vehicle having a seat-support provided with inwardly-facing seats, said support being pivotally secured to the floor or bottom of the vehicle, whereby it may be turned from one position to a position at right angles thereto.

2. A vehicle having a front seat and two connected inwardly-facing seats in rear thereof, having a standard connected with an axially-movable base supported on the floor or bottom of the vehicle, whereby said rear seat may assume a position parallel with the front seat, or one at right angles thereto and parallel with the sides of the vehicle.

3. A vehicle having a front seat, a base plate or board in rear thereof, and pivoted centrally to the floor or bottom of the vehicle, in combination with two inwardly-facing seats connected with the base plate or board and adapted to turn therewith, substantially as described.

4. A vehicle having a front seat, a base plate or board in rear thereof, and pivoted upon the floor or bottom of the vehicle, in combination with two inwardly-facing hinged seats connected with the pivoted base-plate and adapted to fold inward toward each other, substantially as herein described.

5. A vehicle having a front seat, a centrally-pivoted base board or plate in rear thereof, and supported upon the floor or bottom of the vehicle, in combination with the rear seat-standards pivoted or hinged to the opposite sides of said base board or plate and the inwardly-facing seats supported on the standards, substantially as described.

6. A vehicle having a front seat hinged to the floor or bottom thereof so that it may be turned forward, in combination with two inwardly-facing and hinged rear seats mounted upon an axially-moving base common to both seats, whereby the positions of the rear seats may be changed with respect to the front seat, substantially as described.

CHARLES M. BLYDENBURGH.

Witnesses:
M. V. BLYDENBURGH,
T. WALTER FOWLER.